United States Patent [19]

Källström

[11] Patent Number: 4,814,217

[45] **Date of Patent: * Mar. 21, 1989**

[54] FIRE RESISTANT WALL ELEMENT

[75] Inventor: Krister Källström, Stockholm, Sweden

[73] Assignee: Hadak Security AB, Eskilstuna, Sweden

[ * ] Notice: The portion of the term of this patent subsequent to Feb. 9, 2005 has been disclaimed.

[21] Appl. No.: 925,969

[22] Filed: Nov. 3, 1986

[30] Foreign Application Priority Data

Nov. 4, 1985 [SE] Sweden ................................ 8505194

[51] Int. Cl.⁴ ................................................ B32B 1/06

[52] U.S. Cl. ........................................ 428/70; 428/76; 428/138; 428/920; 428/921; 428/212

[58] Field of Search ................. 428/920, 921, 212, 70, 428/76, 138

[56] References Cited

U.S. PATENT DOCUMENTS

| | | | |
|---|---|---|---|
| 4,259,401 | 3/1981 | Chahroudi et al. | 428/913 X |
| 4,263,365 | 4/1981 | Burgess et al. | 428/913 X |
| 4,723,385 | 2/1988 | Kallstrom | 428/921 X |

*Primary Examiner*—Alexander S. Thomas

*Attorney, Agent, or Firm*—Nies, Webner, Kurz & Bergert

[57] ABSTRACT

A fire resistant wall element comprises a phase conversion material, preferably glauber salt, the phase conversion of which takes place at a temperature below about 50° C. and is endothermic. According to the invention, the wall element (1) includes a further, a second, phase conversion material (6) placed adjacent the firstmentioned phase conversion material (3), the phase conversion of the further phase conversion material (6) taking place at a higher temperature than the aforementioned temperature, the further phase conversion material (6) being intended to be placed nearer the outer surface (5) of the wall element (1) than the firstmentioned phase conversion material (3), this outer surface being the surface which is heated in the event of fire.

According to one preferred embodiment, the further phase conversion material (6) contains bound water in such large quantities that the endothermic reaction taking place during the phase conversion process essentially constitutes the vaporization of water.

2 Claims, 1 Drawing Sheet

FIRE RESISTANT WALL ELEMENT

The present invention relates to a fire resistant wall element.

The invention relates more specifically to a fire resistant wall element for document filing cabinets, storage cabinets and cupboards or data media, and computer rooms.

Requirements are placed on such cabinets with respect to the maximum temperature level to which the inside thereof will become heated over a given period of time when the outer surfaces of the cabinets are exposed to heat of a given temperature. For example, so-called fire-proof cabinets for storing data media, such as data discettes, are permitted to reach a maximum inner temperature of 50° C. after being exposed for two hours to an outer surface temperature of 1000° C.

The walls of such cabinets are normally made of concrete, or a concrete based material, with a layer of insulating material located on one side of the concrete and plates arranged on both sides of the wall. The concrete wall is built to a thickness such that the thermal conductivity of the concrete, in combination with a certain transference of water from the concrete, will ensure that the inner temperature of the wall, under the influence of the insulating layer, will not exceed the aforesaid temperature value under the conditions mentioned.

The respective thicknesses of the concrete wall and the insulating layer are adjusted when requirements other than those mentioned above are to be fulfilled.

The use of conventional concrete-based materials results in thick and heavy walls.

In order to obtain a temperature delay effect on the inside of a fire resistant cabinet, or cupboard, it has been proposed to incorporate a phase conversion material in the cupboard wall, by which is meant a material which exhibits endothermic phase conversion. This phase conversion shall take place at a temperature which is lower than the maximum temperature to which the inside of the wall can be allowed to reach.

Among other things, the International Application No. W082/00040 proposed the use of glauber salt, i.e. sodium sulphate decahydrate, which has phase conversion temperature (melting temperature) of about 32° C., and a further phase conversion temperature (vaporization of water of crystallisation) of about 100° C.

Silicate compounds have also previously been used to obtain an endothermic conversion, as disclosed, for example, in the German Published Specification DE-OS No. 2413644. This publication teaches the combination of a layer of a silicate compound with a layer of mineral wool.

The U.S. Pat. No. 4,413,869 teaches the use of gypsum, mineral wool, and a mixture of a silicate compound in solid phase and gypsum in solid phase.

The use of a compound which undergoes endothermic conversion for the purpose of delaying a rise in temperature above the level at which the conversion takes place is therefore well known.

However, as evidenced from, inter alia, the aforegoing, this phase conversion material is used together with conventional insulating materials.

One serious drawback associated with the known technique is that thick layers of conventional insulating material must be used together with relatively thick layers of a phase conversion material, due to the fact that the phase conversion material used is one with which the phase conversion takes place at a temperature which is only slightly lower than the maximum permitted temperature, or equivalent thereto.

This drawback is eliminated by means of the present invention which provides a wall element of considerably smaller thickness than the known wall elements while achieving the same performance as said known wall elements.

In addition, the wall element according to the present invention is much lighter in weight than a wall made of concrete material, and hence the weight of resultant wall structures are also reduced when applying the present invention, in comparison with wall structures incorporating conventional wall elements made of a concrete material.

Thus, the present invention relates to a fire resistant wall element incorporating a phase conversion material, preferably glauber salt, the phase conversion of which takes place at a temperature beneath about 50° C. and is endothermic, the wall element being characterized in that it includes a further phase conversion material which is positioned adjacent the firstmentioned phase conversion material and the phase conversion of which further phase conversion material takes place at a higher temperature than said temperature, the further phase conversion material being located nearer the outer surface of the wall element, i.e. the surface which is heated in the event of fire, than the first mentioned phase conversion material.

The invention will now be described in more detail with reference to the accompanying drawing, in which

DETAILED DESCRIPTION

Figure 1:
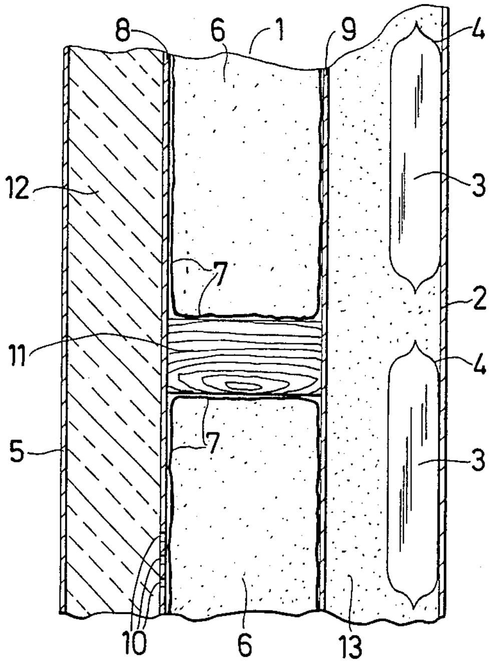
FIG. 1 is a cross-sectional view of a wall element in which a first embodiment of the invention is applied.

FIG. 1 illustrates an embodiment of a wall element 1 in which the present invention is applied.

In order to delay the time at which the temperature of the inner surface 2 of the wall element 1 will exceed, for example, 50° C., phase conversion material 3, preferably glauber salt, is positioned, in a known way, on the inner surface 2. According to one embodiment the phase conversion material 3 is enclosed in bags 4 of a flexible and impervious material, preferably bags made of a three-ply plastic foil.

The inner surface 2 preferably comprises a thin plate, which provides mechanical protection to the interior of the wall element. The outer surface 5 of the wall element 1 also preferably comprises a thin plate.

In accordance with the invention, the wall element 1 incorporates a further phase conversion material, which is located adjacent the first mentioned phase conversion material 3.

The further phase conversion material 6 is one in which the phase conversion takes place at a higher temperature than that at which the phase conversion of the first mentioned phase conversion material takes place. The further phase conversion material 6 is intended to be located nearer the outer surface of the wall element, i.e. the side thereof which becomes heated in the event of a fire, than the first mentioned phase conversion material 3.

The presence of a further phase conversion material 6 delays heat penetration to the first mentioned phase conversion material.

In accordance with the invention there is used a further phase conversion material which contains bound water in such large quantities that the endothermic reaction taking place during the phase conversion process is essentially constituted of the water vaporized.

In this way, large quantities of energy per unit of weight are required to raise the temperature above the vaporization temperature of the water, 100° C.

One compound which can contain large quantities of water in gel form is sodium silicate, $Na_2O.nSiO_2.pH_2O$. Water-glass is one such compound. Water-glass absorbs large quantities of energy in a temperature range slightly above 100° C. This also applies to glauber salt. Whereas water-glass increases its heat content by about 1900 kJ/kg over a temperature range of from 20° C. to 200° C., glauber salt will increase its heat content by about 2000 kJ/kg over the same temperature range.

Pure water will increase its heat content over the aforesaid range of 20° C. to 200° C. by about 3000 kJ/kg. Thus, in the present context, water is more effective than water-glass and glauber salt while being substantially cost free.

However, in addition to undergoing a phase conversion at a temperature of 100° C. or slightly thereabove, glauber salt also undergoes a conversion at about 32° C. Thus, the heat content of glauber salt increases by 240 kJ/kg over a temperature range of 20° C. to 50° C., and hence glauber salt is suitable for use nearest the inner surface 2 of the wall element 1. A corresponding increase in heat content over the temperature range of 20° C. to 50° C. is also exhibited by fixer salt and paraffin.

Thus, water is a particularly inexpensive and effective medium for use in conjunction with the present invention, although it has the disadvantage that it cannot be used in a free form, or in any event should not be used in a free form, but must be bound.

The aforesaid values also apply to water-glass that contains 60% by weight water.

In accordance with one embodiment of the present invention the further phase conversion material comprises a mass produced by mixing water-glass in liquid phase, cement and water, where the water is added in quantities such that the weight of free water added exceeds the total weight of water-glass and cement, but is less than about three times the total weight of said water-glass and cement.

The cement used is preferably Portland cement, although other types of cement can be used. It has been found that masonry lime can be used instead of cement.

The ratio between the weight of cement and the weight of water-glass, preferably water-glass containing 60% by weight water, exceeds about 0.4 in accordance with one preferred embodiment of the invention.

Two mixing examples are given below. In both examples there was first prepared a pre-mix comprising Portland cement and water. This pre-mix was subsequently used as a curing or setting agent for the liquid water-glass subsequent to mixing the water-glass and pre-mix together.

EXAMPLE I

A pre-mix comprising 15 kg Portland cement and 65 kg water was prepared and then mixed with 20 kg 60%-water-glass. The mixture hardened within the space of one minute into a gel-like, but relatively solid mass. The mass had a density of 1330 kg/m$^3$. The water content of the mass was 77%.

EXAMPLE II

A pre-mix comprising 80 kg Portland cement and 720 kg water was prepared. 200 kg of water-glass containing 60% water were then admixed with the pre-mix. The resultant mixture hardened to a gel-like but relatively solid mass within the space of six minutes. The mass had a density of 1130 kg/m$^3$. The water content of the mass was thus as high as 84%.

The time taken to cure such masses is primarily influenced by the amount of Portland cement in the mixture. The curing time decreases with increasing proportions of Portland cement. A short curing time is normally beneficial for production reasons of a technical nature. As beforementioned, water increases its heat content by about 3000 kJ/kg in the temperature range 20° C. to 200° C.

The heat content of the mixture according to Example II above also increases by about 2800 kJ/kg over the temperature range of 20° C. to 200° C. This, in combination with the fact that the present mixture is particularly inexpensive, makes the material particularly suited for use as the aforesaid further phase conversion material.

As mentioned in the aforegoing, the mixture can be cast to obtain a gel-like but relatively solid mass. Due to the high water content of the mass, which may reach to about 85%, the mass is preferably encased in an impervious plastic foil bag 7, for example a bag made of polypropylene foil, in order to prevent the mass from drying-out. Consequently, when constructing a wall element in accordance with the invention, the mixture is cast in plastic foil bags 7 in a shape or form intended for the wall element concerned.

Alternatively, the aforesaid casing may comprise steel plates or plates made of some other metal. In this case, the plates are connected together at the corners thereof, or are connected with the aid of an impervious plastic tape to wooden strips or battens incorporated in stud work located between the plates. When the wall is heated to a temperature which causes the water in the mass to vaporize, the plastic tape will burst, thereby permitting water to escape from the space formed between the plates. When the plates are connected to wooden battens, the battens are provided with holes which are sealed-off with an impervious plastic tape.

In accordance with one preferred embodiment, the requisite mechanical strength is obtained by surrounding the bags with thin plates 8,9 which define a cavity into which the bags are placed. In this case, the plate located nearest the ultimate outer surface of the wall element is perforated with a number of small holes 10, of which only a few are shown in FIG. 1. These holes are provided to enable water vapour to escape in a direction towards the outer surface of the wall element, this water vapour being generated when the outer surface of the wall element is heated to a temperature which causesthe water in the mass to vaporize, so that the bags 7 burst under the pressure prevailing therein.

The embodiment of FIG. 1 includes a wooden batten 11 which forms a spacer between the plates 8,9. The use of a wooden batten avoids the formation of thermal bridges.

In accordance with one embodiment, holes 10 are solely provided on the externally located plate 8 in the vicinity of the corners formed by two or three mutually adjacent wall elements. As a result, the water vapour, or steam, flowing from the further phase conversion material is conducted to said corners, which are therewith cooled. Depending on the construction of the stud work in which the aforesaid wooden battens 11 are incorporated, notches or like cut-outs must be made in the battens 11 in order to permit water vapour to pass the battens, so that the water vapour can be led to the periphery of the wall element, i.e. the corners thereof.

In order to delay the transference of heat from the outer surface of the wall element to the further phase conversion material, an insulating layer 12 of mineral wool or the like is provided between the perforated plate 8 and the plate 5 forming the outer surface of the wall element.

In order to hold the bags 4 containing the firstmentioned phase conversion material in position, and to isolate these bags from the further phase conversion material, the space 13 between the plate 9 and the plate 2 forming the inner surface of the wall element is filled with polyurethane foam or the like, subsequent to placing the bags in position.

The aforedescribed wall element has been found to be highly effective. In order to satisfy the conditions mentioned in the introduction, the wall element can be given the following dimensions. The thickness of the bags 4, calculated from right to left in FIG. 1, may be 10 mm, where the total width of the space between the plates 2 and 9 is 20 mm. The thickness of the bags 7 may be 30 mm and the thickness of the mineral wool layer 12 20 mm. The inner plates 8,9 are suitably given a thickness of 1 mm, and the plates 2,5 on respective sides of the wall element are suitably given a thickness of 0.5 mm.

Figure 2:
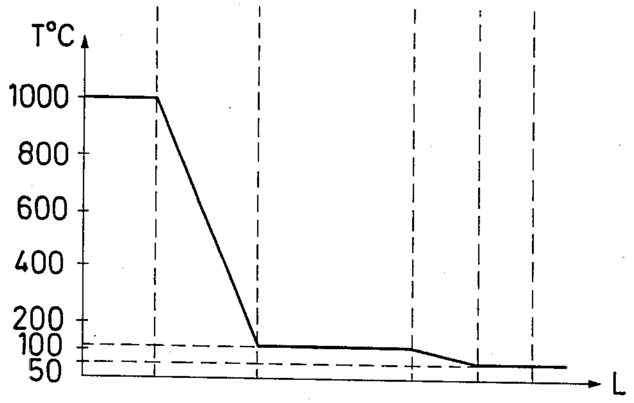
FIG. 2 is a schematic illustration of a temperature curve through the wall element illustrated in FIG. 1.

Thus, such a wall element will have a total thickness of merely 73 mm. FIG. 2 illustrates schematically a temperature curve through the wall element when subjected to an external temperature of 1000° C., at a time point at which the heat has penetrated to the firstmentioned phase conversion material.

As will be seen from the graph, when a further phase conversion material is used, in which predominantly vaporization of the water is utilized, the temperature gradient falls from 1000° C. to 100° C. over the mineral wool layer 12. Since a large quantity of heat is consumed in vaporizing all the water present in the further phase conversion material, the temperature of this material could be held within a temperature range of about 100° C. in the final stages of a test carried out in accordance with the conditions mentioned in the introduction. This means that the temperature of the polyurethane layer 13 on the outside of the plate 9 can be held to a temperature of merely 100° C. Due to the extremely good thermal insulating properties of polyurethane foam, only relatively small quantities of heat are transported through the polyurethane layer 13.

The use of the firstmentioned phase conversion material 3 prevents the inner surface 2 of the wall element reaching a temperature in excess of 50° C. during a test of the aforesaid kind.

As beforementioned, when the wall element does not include the further phase conversion material, the wall element must have a much greater thickness than the thickness of the present wall element in order to achieve the low temperatures which prevail on the side of the bags 4 facing the outer surface of the wall.

Thus, the wall element constructed in accordance with the present invention is much thinner than a comparable wall element constructed in accordance with conventional techniques. Because the wall element is relatively thin, it is also relatively light in weight. The wall element is also relatively inexpensive.

In the aforegiven example the firstmentioned phase conversion material 3 is enclosed in bags 4 placed on the inside of the wall element.

Figure 3:
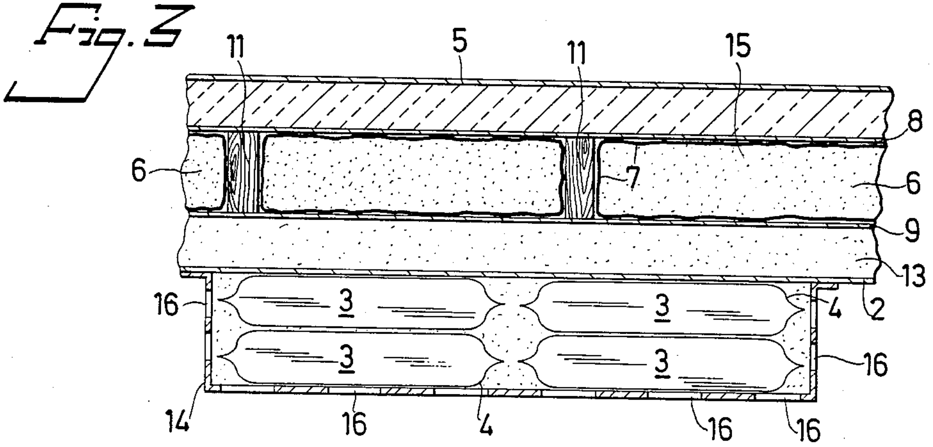
FIG. 3 is a cross-sectional view of a ceiling element constructed in accordance with a second embodiment of the invention.

In accordance with a further, preferred embodiment illustrated in FIG. 3, particularly with respect to such spaces as computer rooms and fire-proof cabinets, the first phase conversion material 3 is positioned at that location in the space at which the quickest rise in temperature can be expected. Thus, in respect of spaces such as these, there may be placed in the ceiling 15 of said space a cassette 14 or container in which bags 4 containing the first phase conversion material 3 are held. The effect produced hereby corresponds to the aforementioned respect, since the phase conversion of the first phase conversion material lowers the temperature of the air in said space.

In accordance with this embodiment, both the vertical walls and the ceiling of the space or room may be constructed in accordance with the embodiment of FIG. 1, but with the difference that the bags 4 are removed so that the space 13 solely contains insulating material.

To fasten a cassette in the ceiling or position a number of bags 4 containing the first phase conversion material along the inner surface of the ceiling in some suitable form of container means that the wall element from which the ceiling is made thus incorporates both phase conversion materials, even though the first phase conversion material is placed on the other side of the inner surface 2 of the wall element in comparison with that illustrated in FIG. 1.

Only a part of a ceiling 15 together with a cassette 14 is illustrated in FIG. 3. The number of cassettes used and the positioning thereof can be varied as required. The cassette 14 or container may be provided with a number of large holes 16 to permit effective exchange of air around the bags 4.

It will be obvious from the aforegoing that the present invention eliminates the aforesaid disadvantages associated with known techniques.

Wall elements of the present kind may be used to construct the walls of document filing cabinets and storage cupboards. In this case the plates incorporated in the wall elements are used to fasten various wall elements together, to form such a cabinet. The door of the cabinet is also constructed in accordance with the invention.

However, wall elements according to the invention can also be used, to advantage, in the construction of walls for computer rooms and other rooms containing equipment which is sensitive to temperatures above a given level. The walls can either be delivered as ready-to-install elements or may be constructed on site and integrated with adjacent walls, ceilings and floors of the building. The doors of such rooms should also be constructed in accordance with the present invention.

The above description has been concerned solely with exemplifying embodiments of the invention.

It will be understood that the metal plates can be replaced with sheets of some other material, such as building panels. In addition, the thickness of the various components of the wall element may be varied and adapted to different, required degrees of fire resistance.

The present invention shall not therefore be considered to be limited to the aforedescribed embodiments, and it shall be understood that modifications can be made within the scope of the following claims.

We claim:

1. A fire resistant wall element comprising: a first phase conversion material, the phase conversion of which takes place at a first temperature below about 50° C. and is endothermic, said wall element (1) also comprising a further, a second, phase conversion material (6) placed adjacent the first phase conversion material (3) and the phase conversion of which second phase conversion material (6) takes place at a higher temperature than said first temperature, said further phase conversion material (6) being located nearer the outer side (5) of the wall element (1) than said first phase conversion material (3), i.e., the side of said wall element which is heated in the event of fire, said further, second, phase conversion material (6) comprising a mass produced from a mixture of water-glass in liquid phase, cement and water, wherein said mass of further, second, phase conversion material contains bound water in such quantities that the endothermic reaction taking place during the phase conversion process is essentially constituted by the vaporization of the water; an impervious casing made from plastic foil (7) embracing and enclosing said further, second, phase conversion material; two mutually spaced apart and mutually parallel thin plates (8, 9) surrounding said plastic foil impervious casing, a one of said thin plates (8) which is located nearest the ultimate outer surface (5) of the wall element (1) is perforated with a number of small holes (10); bags (4) of a flexible and impervous material enclose said first phase conversion material with said bags (4) containing said first phase conversion material (3) placed nearer the ultimate inner surface (2) of the wall element (1) than to the other outer surface (5) of said wall element, said inner surface of the wall element comprising a thin metal plate (2); and an insulating material (13), made from polyurethane foam, provided in a wall section comprising a space located between said inner surface (2) and the said thin plate (9) located nearest the inner surface (2) and facing said further phase converison material (6); said fire resistant wall element including a cassette (14) or container, as part of and adjacent the inner thin metal plate (2) of the wall element, said cassette (14) containing said firstmentioned phase conversion material; and wherein only said polyurethane foam is accommodated in said wall section space.

2. A fire resistant wall element comprising: a first phase conversion material, the phase conversion of which takes place at a first temperature below about 50° C. and is endothermic, said wall element (1) also comprising a further, a second, phase conversion material (6) placed adjacent the first phase conversion material (3) and the phase conversion of which second phase conversion material (6) takes place at a higher temperature than said first temperature, said further phase conversion material (6) being located nearer the outer side (5) of the wall element (1) than said first phase conversion material (3), i.e., the side of said wall element which is heated in the event of fire, said further, second, phase conversion material (6) comprising a mass produced from a mixture of water-glass in liquid phase, cement and water, wherein said mass of further, second, phase conversion material contains bound water in such quantities that the endothermic reaction taking place during the phase conversion process is essentially constituted by the vaporization of the water; said wall element, from its ultimate outer surface (5) to its ultimate inner surface (2) comprises first, a thin plate (5), next a mineral wool insulating material (12), next a thin plate (8), next said further phase conversion material (6) surrounded by an impervious casing, next a thin plate (9), next polyurethane foam (13), next the first phase conversion material (3) embraced by a plastic impervious material (4), and finally a thin plate (2), being the ultimate inner surface of said wall element.

* * * * *